(12) United States Patent
Xie

(10) Patent No.: US 10,346,192 B2
(45) Date of Patent: Jul. 9, 2019

(54) METHOD, APPARATUS, AND SYSTEM FOR DISPLAYING VIRTUAL MACHINE NAME

(71) Applicant: Huawei Technologies Co., Ltd., Shenzhen (CN)

(72) Inventor: Ning Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

(21) Appl. No.: 15/596,283

(22) Filed: May 16, 2017

(65) Prior Publication Data

US 2017/0249184 A1 Aug. 31, 2017

Related U.S. Application Data

(63) Continuation of application No. PCT/CN2015/077393, filed on Apr. 24, 2015.

(30) Foreign Application Priority Data

Nov. 18, 2014 (CN) .......................... 2014 1 0658440

(51) Int. Cl.
*G06F 9/455* (2018.01)

(52) U.S. Cl.
CPC .......... *G06F 9/45558* (2013.01); *G06F 9/455* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

2002/0069335 A1 6/2002 Flylnn, Jr.
2008/0134175 A1 6/2008 Fitzgerald et al.
(Continued)

FOREIGN PATENT DOCUMENTS

CN 102799464 A 11/2012
CN 103384237 A 11/2013
(Continued)

OTHER PUBLICATIONS

Machine Translation and Abstract of Korean Publication No. KR20130022508, Mar. 7, 2013, 17 pages.
(Continued)

*Primary Examiner* — Wissam Rashid
(74) *Attorney, Agent, or Firm* — Conley Rose, P.C.

(57) ABSTRACT

A method to display a virtual machine name is provided. The method is applied to a virtual machine name management apparatus in a Network Function Virtualization (NFV) system. The NFV system further includes a virtual machine management device and a virtual machine creation device. The method includes receiving, by the virtual machine name management apparatus, a virtual machine name request message sent by the virtual machine management device, generating, according to the virtual machine name request message and each naming convention, a formal name corresponding to the virtual machine creation device and an alias corresponding to each virtual machine management device, and sending the alias corresponding to each virtual machine management device to each virtual machine management device. Different names may be displayed for a same virtual machine in each virtual machine management device in the NFV system.

13 Claims, 11 Drawing Sheets

(56) References Cited

U.S. PATENT DOCUMENTS

| | | | |
|---|---|---|---|
| 2012/0066391 A1 | 3/2012 | Gargash et al. | |
| 2012/0096271 A1 | 4/2012 | Ramarathinam et al. | |
| 2012/0233608 A1 | 9/2012 | Toeroe | |
| 2013/0067464 A1 | 3/2013 | Shah | |
| 2014/0019960 A1 | 1/2014 | Jacklin et al. | |
| 2014/0022072 A1 | 1/2014 | Grubbs et al. | |
| 2014/0137111 A1 | 5/2014 | Dees, Jr. et al. | |

FOREIGN PATENT DOCUMENTS

| | | | |
|---|---|---|---|
| CN | 104050045 A | 9/2014 | |
| CN | 104484218 A | 4/2015 | |
| JP | H10283210 A | 10/1998 | |
| JP | 2013537340 A | 9/2013 | |
| KR | 20130022508 A | 3/2013 | |
| KR | 20140102926 A | 8/2014 | |

OTHER PUBLICATIONS

Foreign Communication From a Counterpart Application, Korean Application No. 10-2017-7012328, Korean Office Action dated Feb. 9, 2018, 6 pages.
Foreign Communication From a Counterpart Application, Korean Application No. 10-2017-7012328, English Translation of Korean Office Action dated Feb. 9, 2018, 4 pages.
Machine Translation and Abstract of Chinese Publication No. CN103384237, Nov. 6, 2013, 18 pages.
Machine Translation and Abstract of Chinese Publication No. CN102799464, Nov. 28, 2012, 13 pages.
Machine Translation and Abstract of Chinese Publication No. CN104050045, Sep. 17, 2014, 32 pages.
Machine Translation and Abstract of Chinese Publication No. CN104484218, Apr. 1, 2015, 25 pages.
Foreign Communication From a Counterpart Application, Chinese Application No. 201410658440.6, Chinese Office Action dated Mar. 20, 2017, 5 pages.
Foreign Communication From a Counterpart Application, PCT Application No. PCT/CN2015/077393, English Translation of International Search Report dated Aug. 17, 2015, 2 pages.
Foreign Communication From a Counterpart Application, PCT Application No. PCT/CN2015/077393, English Translation of Written Opinion dated Aug. 17, 2015, 8 pages.
Machine Translation and Abstract of Japanese Publication No. JPH10283210, Oct. 23, 1998, 15 pages.
Machine Translation and Abstract of Korean Publication No. KR20140102926, Aug. 25, 2014, 21 pages.
Foreign Communication From a Counterpart Application, Korean Application No. 10-2017-7012328, Korean Notice of Allowance and Brief Translation dated Jul. 3, 2018, 3 pages.
Foreign Communication From a Counterpart Application, Japanese Application No. 2017-544811, Japanese Notice of Allowance dated Nov. 12, 2018, 3 pages.
Foreign Communication From a Counterpart Application, European Application No. 15860215.1, Extended European Search Report dated Sep. 27, 2017, 9 pages.

METHOD, APPARATUS, AND SYSTEM FOR DISPLAYING VIRTUAL MACHINE NAME

CROSS-REFERENCE TO RELATED APPLICATIONS

This application is a continuation application of International Patent Application No. PCT/CN2015/077393, filed on Apr. 24, 2015, which claims priority to Chinese Patent Application No. 201410658440.6, filed on Nov. 18, 2014. The disclosures of the aforementioned applications are hereby incorporated by reference in their entireties.

TECHNICAL FIELD

The disclosure relates to the field of computer technologies, and in particular, to a method, an apparatus, and a system for displaying a virtual machine name.

BACKGROUND

After telecommunications applications are cloudified, applications are deployed on one or more virtual machines. According to a Network Function Virtualization (NFV) standard, virtual machine names need to be displayed in multiple systems, such as an Element Management System (EMS), a Virtualized Network Function (VNF) system, a Virtualized Network Function Management (VNFM) system, a Virtualized Infrastructure Management (VIM) system, and a scheduling system Orchestrator.

In the prior art, a name of a virtual machine in each system is either a globally unique name that is allocated by a VIM, or is a name that is manually created by a user when the virtual machine is created and whose uniqueness is ensured by the user. Because maintenance personnel understand the virtual machine names in the different systems differently, great trouble is caused to work of the maintenance personnel of each system when one name is displayed for a same virtual machine in each system.

SUMMARY

Embodiments of the disclosure provide a method for displaying a virtual machine name, which may display different names for a same virtual machine in each virtual machine management device of a NFV system, thereby meeting requirements of maintenance personnel of each virtual machine management device. Embodiments of the disclosure further provide a corresponding apparatus and a system.

A first aspect of the disclosure provides a method for displaying a virtual machine name that is applied to a virtual machine name management apparatus in a NFV system, where the NFV system further includes a virtual machine management device and a virtual machine creation device, where virtual machine naming conventions corresponding to each virtual machine management device and the virtual machine creation device are configured in the virtual machine name management apparatus. The method includes receiving, by the virtual machine name management apparatus, a virtual machine name request message sent by the virtual machine management device; generating, by the virtual machine name management apparatus according to the virtual machine name request message and each naming convention, a formal name corresponding to the virtual machine creation device and an alias corresponding to each virtual machine management device; and sending, by the virtual machine name management apparatus, the alias corresponding to each virtual machine management device to each virtual machine management device, and sending the formal name to the virtual machine management device that sends the virtual machine name request message. When the virtual machine creation device receives a virtual machine creation instruction sent by the virtual machine creation device, the formal name is used to create a virtual machine and configure the formal name for the created virtual machine. The alias is used for displaying on each virtual machine management device corresponding to the alias, so that each virtual machine management device controls the created virtual machine according to the alias.

With reference to the first aspect, in a first possible implementation manner, the method further includes receiving a name query request sent by the virtual machine management device, where the name query request carries an alias of a virtual machine to be operated; finding, according to the alias of the virtual machine to be operated, a formal name of the virtual machine to be operated that corresponds to the alias; and sending the formal name of the virtual machine to be operated to the virtual machine management device that sends the name query request, so that the virtual machine management device that sends the name query request performs, according to the formal name of the virtual machine to be operated, a corresponding operation on the virtual machine to be operated.

With reference to the first possible implementation manner of the first aspect, in a second possible implementation manner, when the operation is to delete the virtual machine to be operated, the method further includes receiving a virtual machine name deletion instruction sent by the virtual machine management device, where the virtual machine name deletion instruction carries the alias of the virtual machine to be deleted; and deleting, according to the alias of the virtual machine to be deleted, all aliases and the formal name of the virtual machine to be deleted.

A second aspect of the disclosure provides a method for displaying a virtual machine name that is applied to a virtual machine management device in a NFV system, where the NFV system further includes a virtual machine name management apparatus and a virtual machine creation device and where virtual machine naming conventions corresponding to each virtual machine management device and the virtual machine creation device are configured in the virtual machine name management apparatus. The method includes sending, by the virtual machine management device, a name request message to the virtual machine name management apparatus, where the name request message is used by the virtual machine name management apparatus to generate, according to each naming convention, a formal name corresponding to the virtual machine creation device and an alias corresponding to each virtual machine management device. The alias is sent by the virtual machine name management apparatus to the virtual machine management device corresponding to the alias and is displayed on the virtual machine management device corresponding to the alias. The method also includes receiving the formal name and the alias of the virtual machine management device that are sent by the virtual machine name management apparatus; sending a virtual machine creation instruction to the virtual machine creation device, where the virtual machine creation instruction carries the formal name, so that the virtual machine creation device creates a virtual machine and configures the formal name for the created virtual machine; and displaying the alias of the virtual machine management device.

With reference to the second aspect, in a first possible implementation manner, the method further includes receiving an operation instruction for a virtual machine to be operated; sending a name query request to the virtual machine name management apparatus, where the name query request carries an alias of the virtual machine to be operated and where the alias of the virtual machine to be operated is used by the virtual machine name management apparatus to find a formal name of the virtual machine to be operated; and receiving the formal name of the virtual machine to be operated, and performing, according to the formal name of the virtual machine to be operated, a corresponding operation on the virtual machine to be operated.

With reference to the first possible implementation manner of the second aspect, in a second possible implementation manner, when the operation is to delete the virtual machine to be operated, the method further includes sending a virtual machine name deletion instruction to the virtual machine name management apparatus, where the virtual machine name deletion instruction carries the alias of the virtual machine to be deleted, so that the virtual machine name management apparatus deletes, according to the alias of the virtual machine to be deleted, all aliases and the formal name of the virtual machine to be deleted.

A third aspect of the disclosure provides a virtual machine name management apparatus that is applied in an NFV system, where the NFV system further includes a virtual machine management device and a virtual machine creation device and where virtual machine naming conventions corresponding to each virtual machine management device and the virtual machine creation device are configured in the virtual machine name management apparatus. The apparatus includes a receiving unit configured to receive a virtual machine name request message sent by the virtual machine management device; a generating unit configured to generate, according to the virtual machine name request message received by the receiving unit and each naming convention, a formal name corresponding to the virtual machine creation device and an alias corresponding to each virtual machine management device; and a sending unit configured to send the alias generated by the generating unit and corresponding to each virtual machine management device to each virtual machine management device, and send the formal name to the virtual machine management device that sends the virtual machine name request message, where when the virtual machine creation device receives a virtual machine creation instruction sent by the virtual machine creation device, the formal name is used to create a virtual machine and configure the formal name for the created virtual machine, and the alias is used for displaying on each virtual machine management device corresponding to the alias, so that each virtual machine management device controls the created virtual machine according to the alias.

With reference to the third aspect, in a first possible implementation manner, the apparatus further includes a finding unit. The receiving unit is configured to receive a name query request sent by the virtual machine management device, where the name query request carries an alias of a virtual machine to be operated. The finding unit is configured to find, according to the alias of the virtual machine to be operated that is received by the receiving unit, a formal name of the virtual machine to be operated that corresponds to the alias. The sending unit is further configured to send the formal name of the virtual machine to be operated that is found by the finding unit to the virtual machine management device that sends the name query request, so that the virtual machine management device that sends the name query request performs, according to the formal name of the virtual machine to be operated, a corresponding operation on the virtual machine to be operated.

With reference to the first possible implementation manner of the third aspect, in a second possible implementation manner, the apparatus further includes a deleting unit. The receiving unit is further configured to receive, when the operation is to delete the virtual machine to be operated, a virtual machine name deletion instruction sent by the virtual machine management device, where the virtual machine name deletion instruction carries the alias of the virtual machine to be deleted. The deleting unit is configured to delete, according to the alias of the virtual machine to be deleted that is received by the receiving unit, all aliases and the formal name of the virtual machine to be deleted.

A fourth aspect of the disclosure provides a virtual machine management device, where the virtual machine management device is applied in an NFV system and where the NFV system further includes a virtual machine name management apparatus and a virtual machine creation device, where virtual machine naming conventions corresponding to each virtual machine management device and the virtual machine creation device are configured in the virtual machine name management apparatus. The machine management device includes a sending unit configured to send a name request message to the virtual machine name management apparatus, where the name request message is used by the virtual machine name management apparatus to generate, according to each naming convention, a formal name corresponding to the virtual machine creation device and an alias corresponding to each virtual machine management device. The alias is sent by the virtual machine name management apparatus to the virtual machine management device corresponding to the alias and is displayed on the virtual machine management device corresponding to the alias. The machine management device includes a receiving unit configured to acquire the formal name and the alias of the virtual machine management device that are sent by the virtual machine name management apparatus; the sending unit, further configured to send a virtual machine creation instruction to the virtual machine creation device, where the virtual machine creation instruction carries the formal name received by the receiving unit, so that the virtual machine creation device creates a virtual machine and configures the formal name for the created virtual machine; and a displaying unit configured to display the alias of the virtual machine management device that is acquired by the receiving unit.

With reference to the fourth aspect, in a first possible implementation manner, the virtual machine management device further includes a processing unit. The receiving unit is configured to acquire an operation instruction for a virtual machine to be operated. The sending unit is configured to send a name query request to the virtual machine name management apparatus, where the name query request carries an alias of the virtual machine to be operated and where the alias of the virtual machine to be operated is used by the virtual machine name management apparatus to find a formal name of the virtual machine to be operated. The receiving unit is configured to receive the formal name of the virtual machine to be operated. The processing unit is configured to perform, according to the formal name of the virtual machine to be operated that is received by the receiving unit, a corresponding operation on the virtual machine to be operated.

With reference to the first possible implementation manner of the fourth aspect, in a second possible implementation manner, the sending unit is further configured to send, when the operation is to delete the virtual machine to be operated, a virtual machine name deletion instruction to the virtual machine name management apparatus, where the virtual machine name deletion instruction carries the alias of the virtual machine to be deleted, so that the virtual machine name management apparatus deletes, according to the alias of the virtual machine to be deleted, all aliases and the formal name of the virtual machine to be deleted.

A fifth aspect of the disclosure provides an NFV system, including a virtual machine name management apparatus, a virtual machine management device, and a virtual machine creation device, where virtual machine naming conventions corresponding to each virtual machine management device and the virtual machine creation device are configured in the virtual machine name management apparatus. The virtual machine name management apparatus is configured to receive a virtual machine name request message sent by the virtual machine management device; generate, according to the virtual machine name request message and each naming convention, a formal name corresponding to the virtual machine creation device and an alias corresponding to each virtual machine management device; send the alias corresponding to each virtual machine management device to each virtual machine management device; and send the formal name to the virtual machine management device that sends the virtual machine name request message. When the virtual machine creation device receives a virtual machine creation instruction sent by the virtual machine creation device, the formal name is used to create a virtual machine and configure the formal name for the created virtual machine. The alias is used for displaying on each virtual machine management device corresponding to the alias, so that each virtual machine management device controls the created virtual machine according to the alias. The virtual machine management device is configured to receive the formal name and the alias of the virtual machine management device that are sent by the virtual machine name management apparatus; send a virtual machine creation instruction to the virtual machine creation device, where the virtual machine creation instruction carries the formal name, so that the virtual machine creation device creates a virtual machine and configures the formal name for the created virtual machine; and display the alias of the virtual machine management device.

A method for displaying a virtual machine name is provided by an embodiment of the disclosure, and applied to a virtual machine name management apparatus in an NFV system. The NFV system further includes a virtual machine management device and a virtual machine creation device. Virtual machine naming conventions corresponding to each virtual machine management device and the virtual machine creation device are configured in the virtual machine name management apparatus. The method includes receiving, by the virtual machine name management apparatus, a virtual machine name request message sent by the virtual machine management device; generating, according to the virtual machine name request message and each naming convention, a formal name corresponding to the virtual machine creation device and an alias corresponding to each virtual machine management device; and sending the alias corresponding to each virtual machine management device to each virtual machine management device, and sending the formal name to the virtual machine management device that sends the virtual machine name request message. When the virtual machine creation device receives a virtual machine creation instruction sent by the virtual machine creation device, the formal name is used to create a virtual machine and configure the formal name for the created virtual machine, and the alias is used for displaying on each virtual machine management device corresponding to the alias, so that each virtual machine management device controls the created virtual machine according to the alias. Compared with the prior art where a same name is displayed for a same virtual machine in each virtual machine management device, the method for displaying a virtual machine name according to the embodiment of the disclosure may display different names for a same virtual machine in each virtual machine management device of an NFV system, thereby meeting requirements of maintenance personnel of each virtual machine management device.

BRIEF DESCRIPTION OF DRAWINGS

To describe the technical solutions in the embodiments of the disclosure or in the prior art more clearly, the following briefly introduces the accompanying drawings required for describing the embodiments or the prior art. The accompanying drawings in the following description show merely some embodiments of the disclosure, and a person of ordinary skill in the art may still derive other drawings from these accompanying drawings without creative efforts.

DESCRIPTION OF EMBODIMENTS

Embodiments of the disclosure provide a method for displaying a virtual machine name, which may display different names for a same virtual machine in each virtual machine management device of a NFV system, thereby meeting requirements of maintenance personnel of each virtual machine management device. Embodiments of the disclosure further provide a corresponding apparatus and a system. Detailed descriptions are hereinafter provided separately.

To make a person skilled in the art understand the solutions of the disclosure better, the following clearly and completely describes the technical solutions in the embodiments of the disclosure with reference to the accompanying drawings in the embodiments of the disclosure. The described embodiments are merely a part rather than all of the embodiments of the disclosure. All other embodiments obtained by a person of ordinary skill in the art based on the embodiments of the disclosure without creative efforts shall fall within the protection scope of the disclosure.

Figure 1:
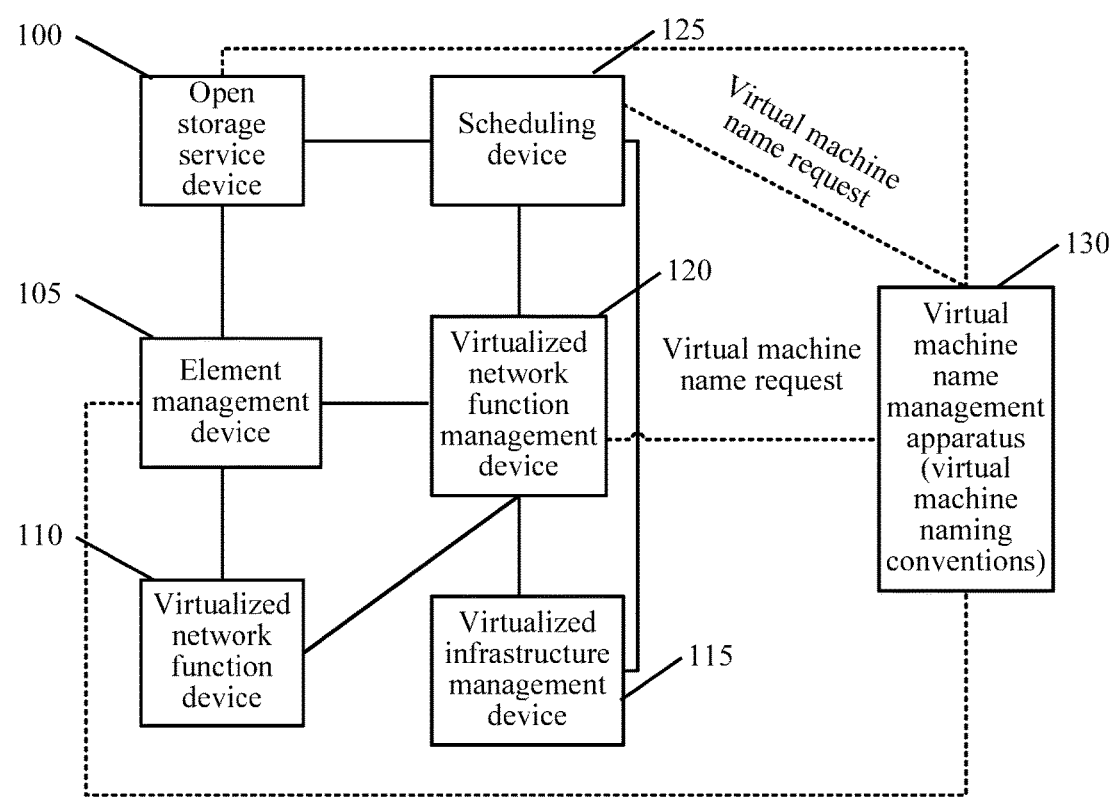
FIG. 1 is a schematic diagram of an embodiment of a method for displaying a virtual machine name according to an embodiment of the disclosure.

Referring to FIG. 1, an embodiment of a method for displaying a virtual machine name according to an embodiment of the disclosure includes:

An NFV system may include an Open Storage Service (OSS) device 100, an EMS device 105, a VNF device 110, a VIM device, 115 a VNFM device 120, and a scheduling Orchestrator device 125. The VIM device 115 is a virtual machine creation device in the embodiment of the disclosure, and other devices are virtual machine management devices in the embodiment of the disclosure. In addition, the virtual machine management device in the embodiment of the disclosure is not limited to one device, and may be a device cluster. Among the virtual machine management devices, the VNFM device 120 is responsible for managing the VNF device 110. In the embodiment of the disclosure, a virtual machine name management apparatus 130 is further included, where the virtual machine name management apparatus 130 may be an independent device that may interact with each virtual machine management device, or may be a module integrated with any virtual machine management device. However, regardless of whether the virtual machine name management apparatus 130 is an independent apparatus or is a module integrated with a virtual machine management device, it can complete a function of virtual machine name management described in the embodiment of the disclosure.

The virtual machine name management apparatus 130 shown in FIG. 1 is independently installed in the NFV system, where virtual machine naming conventions corresponding to each virtual machine management device and the virtual machine creation device are pre-configured in the virtual machine name management apparatus 130. In the embodiment of the disclosure, the VNFM device 120 or Orchestrator device 125 is responsible for triggering the VIM device 115 to create a virtual machine. Therefore, before creation of the virtual machine, the VNFM device 120 or Orchestrator device 125 requests, from the virtual machine name management apparatus 130, an alias and a formal name of the virtual machine to be created. The formal name in the embodiment of the disclosure is used in the device, and the alias is used for displaying on each virtual machine management device, so that maintenance personnel of each virtual machine management device may control the virtual machine by using a virtual machine name format familiar to the maintenance personnel.

The virtual machine naming conventions may include a formal name naming convention of the virtual machine, for example, a naming convention description file provided by an operator, and an alias naming convention of the virtual machine in an OSS device 100, such as a convention customization file applicable to the OSS device 100. The alias naming convention may further include an EMS alias convention customization file, a VNF device alias convention customization file, a VNFM device alias convention customization file, an Orchestrator device alias convention customization file, and the like.

In the embodiment of the disclosure, a formal name and an alias created by the virtual machine name management apparatus 130 for each virtual machine name request are different, and a formal name and an alias created each time for a same virtual machine are associated. An association between the formal name and the alias for the same virtual machine are stored in the virtual machine name management apparatus.

After creating the formal name and alias for the same virtual machine, the virtual machine name management apparatus 130 sends the formal name to a device that requests a name, as shown in FIG. 1, to the VNFM device 120 or Orchestrator device 125, and the VNFM device 120 or Orchestrator device 125 instructs the VIM 115 to create a virtual machine and allocate the formal name to the created virtual machine. The virtual machine name management apparatus 130 directly or indirectly sends aliases for the virtual machine to the OSS 100, EMS 105, VNFM 120, VNF 110, Orchestrator 125, and the like. For example, aliases for the created virtual machine are an alias 11, an alias 12, an alias 13, an alias 14, and an alias 15 respectively. Therefore, for the created virtual machine, the alias 11 is displayed on the OSS device 100, the alias 12 is displayed on the EMS 105, the alias 13 is displayed on the VNFM 120, the alias 14 is displayed on the VNF 110, and the alias 15 is displayed on the Orchestrator 125.

When maintenance personnel of devices perform corresponding operations on the virtual machine, for example, operations such as power-on, power-off, restart, and termination, the maintenance personnel operate corresponding aliases on respective devices, then find the corresponding formal name in the virtual machine name management apparatus according to the aliases, and thereby perform corresponding operations. For example, if maintenance personnel of the VNFM 120 need to perform a termination operation on the virtual machine, the maintenance personnel send a name query request to the virtual machine name management apparatus 130, where the name query request carries an alias 3. Therefore, the virtual machine name management apparatus 130 finds a formal name 1 according to the alias 3, and then determines the virtual machine corresponding to the formal name 1, and thereby deletes the virtual machine corresponding to the formal name 1. After the virtual machine is deleted, the VNFM 120 instructs each virtual machine management device to delete the corresponding alias, and instructs the virtual machine name management apparatus 130 to delete the formal name and aliases for the virtual machine, thereby saving storage space.

For ease of understanding, the following uses several specific scenarios as an example for describing a process of displaying a virtual machine name in an embodiment of the disclosure.

Figure 2:
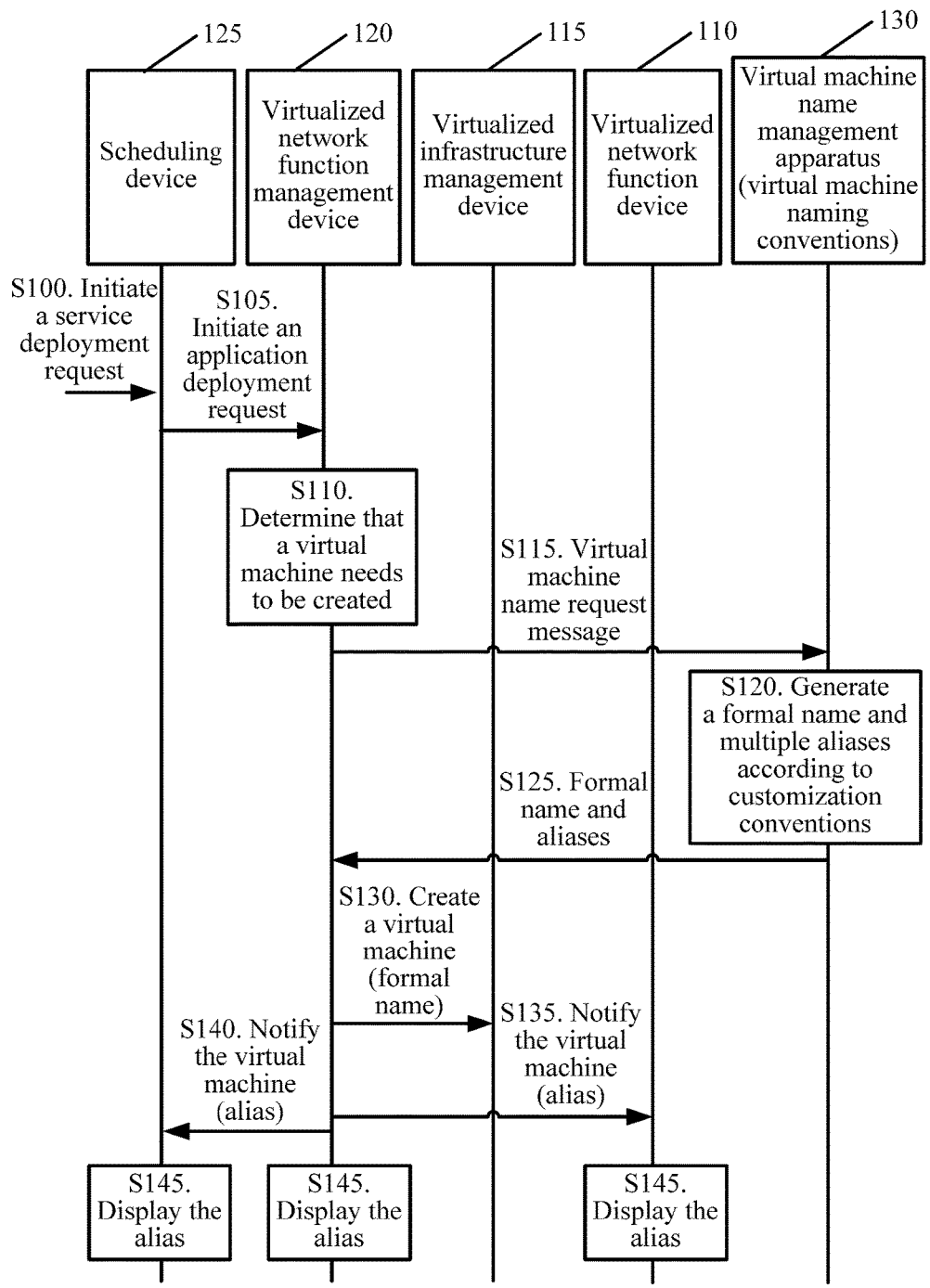
FIG. 2 is a flow diagram of another embodiment of a method for displaying a virtual machine name according to an embodiment of the disclosure.

Reference may be made to FIG. 2, which is a process of a method for displaying a virtual machine name when a VNFM 120 initiates creation of a virtual machine.

S100. An Orchestrator 125 receives a service deployment request initiated by a user.

S105. The Orchestrator 125 initiates an application deployment request related to the service to a VNFM 120.

S110. The VNFM 120 determines that a virtual machine needs to be created.

S115. The VNFM 120 sends a virtual machine name request message to a virtual machine name management apparatus 130.

S120. The virtual machine name management apparatus 130 generates, according to pre-configured naming conventions, a formal name and multiple aliases for the virtual machine to be created.

S125. The virtual machine name management apparatus 130 sends the formal name and aliases of the virtual machine to be created to the VNFM 120.

S130. The VNFM 120 sends a virtual machine creation instruction to a VIM 115, instructing the VIM 115 to create a virtual machine and configure the formal name for the created virtual machine.

S135. The VNFM 120 notifies a VNF 110 of an alias of the created virtual machine.

S140. The VNFM 120 notifies the Orchestrator 120 of an alias of the created virtual machine.

S145. The Orchestrator 125, VNFM 120, and VNF 110 display the aliases of the virtual machine respectively.

In this way, the maintenance personnel of each virtual machine management device may control the virtual machine by using a virtual machine name format familiar to the maintenance personnel.

Figure 3:
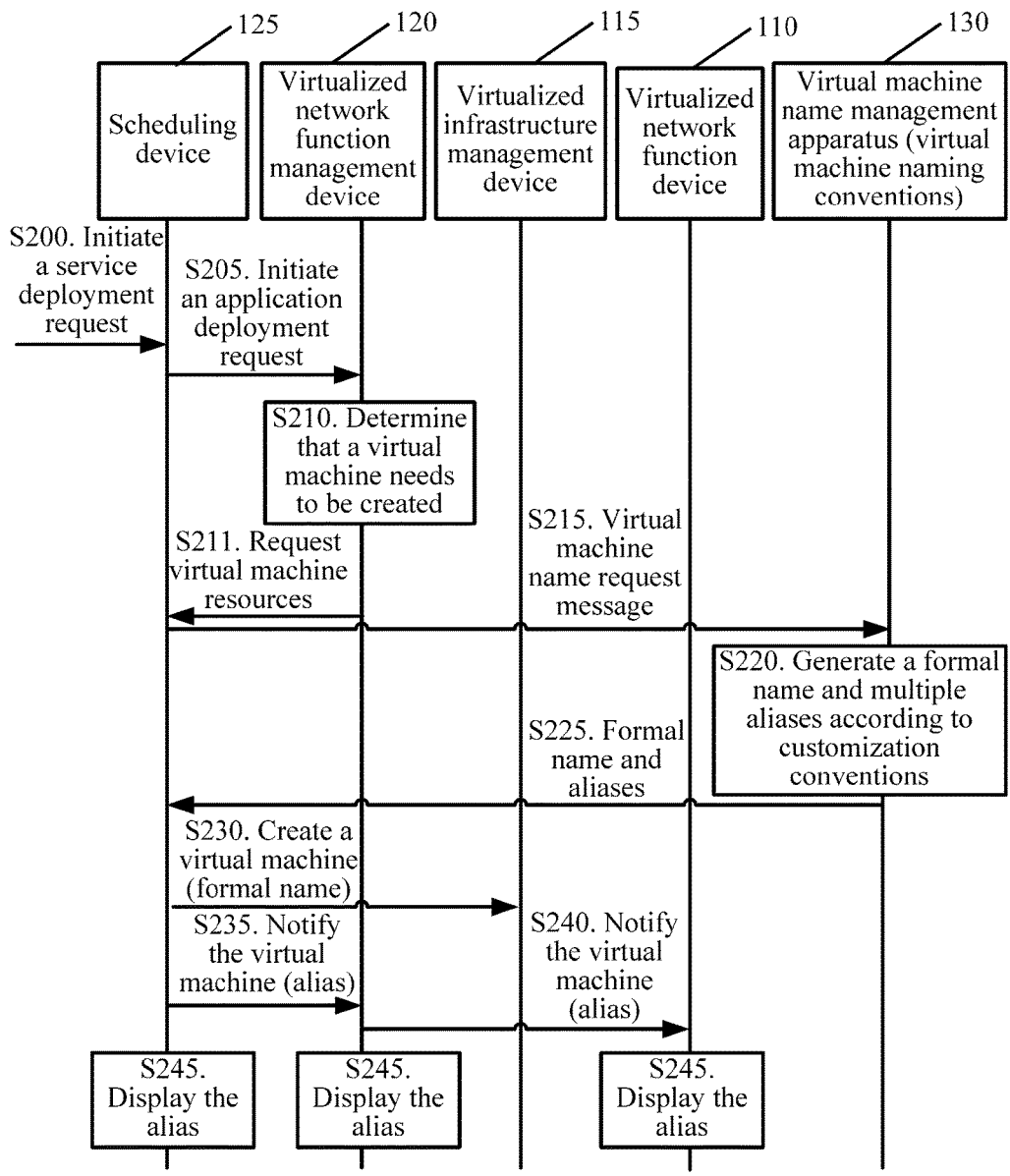
FIG. 3 is a flow diagram of another embodiment of a method for displaying a virtual machine name according to an embodiment of the disclosure.

Reference may be made to FIG. 3, which is a process of a method for displaying a virtual machine name when an Orchestrator 125 initiates creation of a virtual machine.

S200-S210 are the same as steps S100-S110, and are not further described herein.

S211. The VNFM 120 requests virtual machine resources from the Orchestrator 125.

S215. The Orchestrator 125 sends a virtual machine name request message to a virtual machine name management apparatus 130.

S220. The virtual machine name management apparatus 130 generates, according to pre-configured naming conventions, a formal name and multiple aliases for the virtual machine to be created.

S225. The virtual machine name management apparatus 130 sends the formal name and aliases of the virtual machine to be created to the Orchestrator 125.

S230. The Orchestrator sends a virtual machine creation instruction to a VIM 115, instructing the VIM 115 to create a virtual machine and configure the formal name for the created virtual machine.

S235. The Orchestrator 125 notifies the VNFM 120 of an alias of the created virtual machine.

S240. The VNFM 120 notifies a VNF 110 of an alias of the created virtual machine.

S245. The Orchestrator 125, VNFM 120, and VNF 110 display the aliases of the virtual machine respectively.

In this way, the maintenance personnel of each virtual machine management device may control the virtual machine by using a virtual machine name format familiar to the maintenance personnel.

Figure 4:
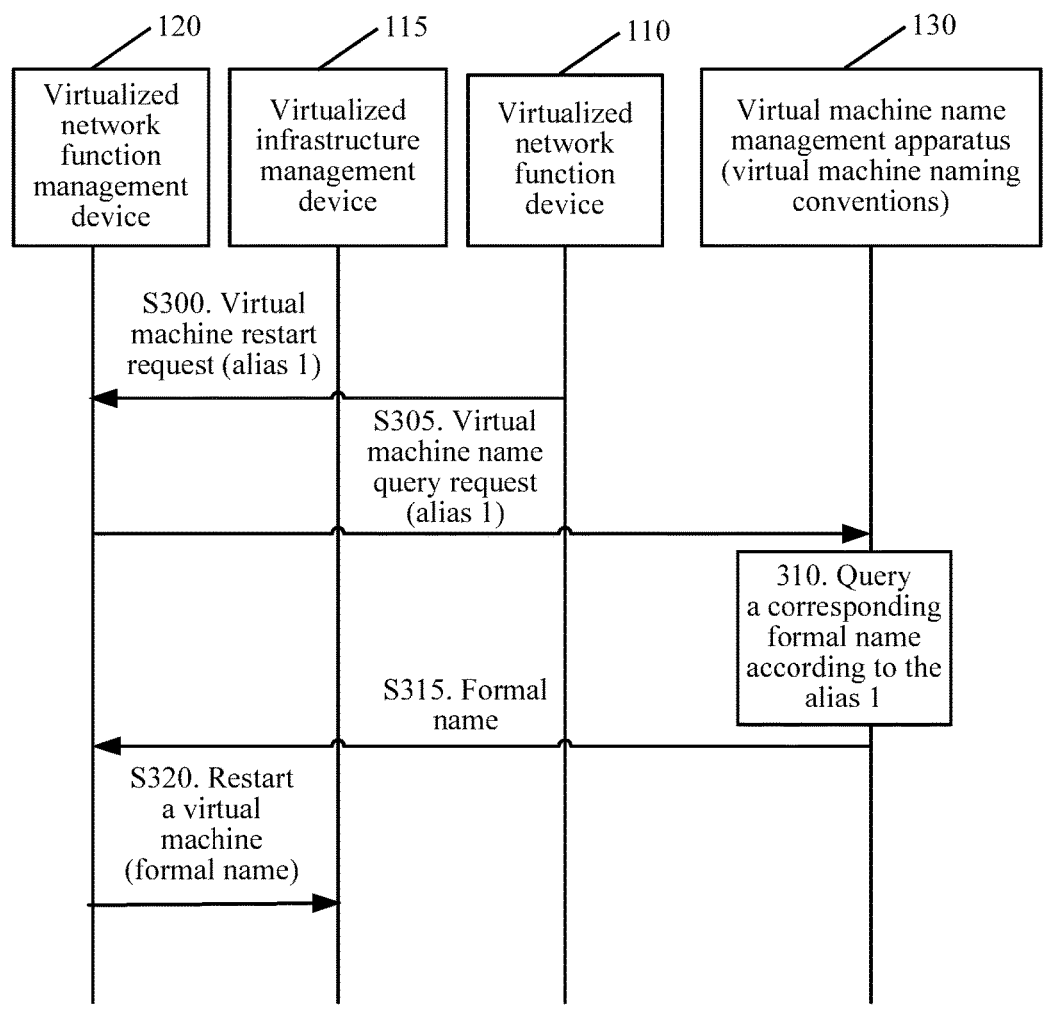
FIG. 4 is a flow diagram of another embodiment of a method for displaying a virtual machine name according to an embodiment of the disclosure.

Reference may be made to FIG. 4, which is a process in which a VNFM 120 controls restart of a virtual machine.

S300. A VNF 110 initiates a virtual machine restart request message to a VNFM 120, where the restart request message carries an alias 1.

S305. The VNFM 120 sends a name query request message to a virtual machine name management apparatus 130, where the name query request message carries the alias 1.

S310. The virtual machine name management apparatus 130 queries a corresponding formal name according to the alias 1.

S315. The virtual machine name management apparatus 130 sends the formal name corresponding to the alias 1 to the VNFM 120.

S320. The VNFM 120 controls restart of a virtual machine of the alias.

Certainly, in this embodiment, only the restart process is used as an example, but actually this embodiment may be also applied to other processes such as power-on and power-off.

Figure 5:
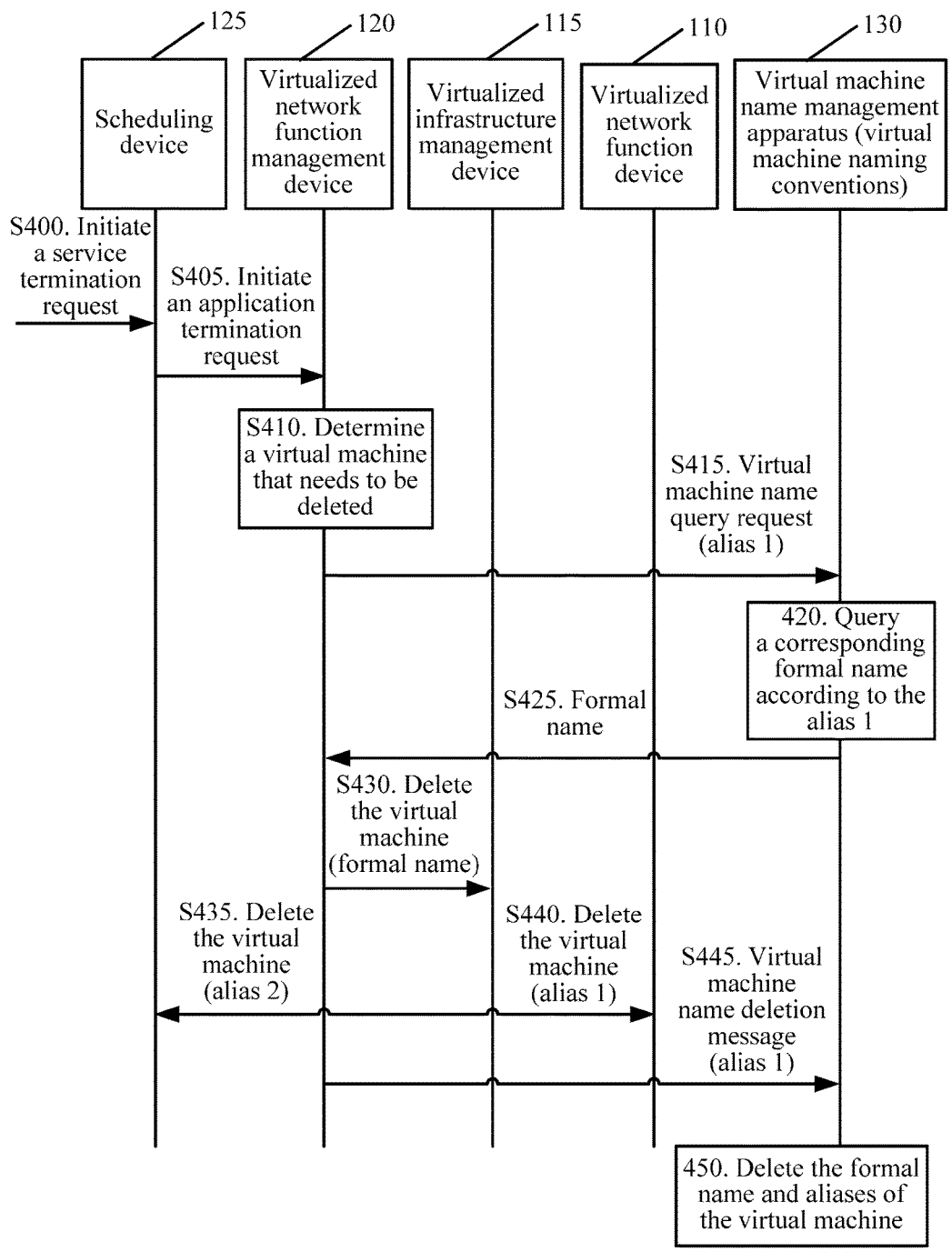
FIG. 5 is a flow diagram of another embodiment of a method for displaying a virtual machine name according to an embodiment of the disclosure.

Reference may be made to FIG. 5, which is a process in which a VNFM 120 controls termination of a virtual machine.

S400. An Orchestrator 125 receives a service termination request initiated by an operator.

S405. The Orchestrator 125 initiates an application termination request to a VNFM 120.

S410. The VNFM 120 determines a virtual machine that needs to be deleted.

S415. The VNFM 120 sends a virtual machine name query request to a virtual machine name management apparatus 130, where the virtual machine name query request carries an alias 1.

S420. The virtual machine name management apparatus 130 queries a corresponding formal name according to the alias 1.

S425. The virtual machine name management apparatus 130 sends the formal name corresponding to the alias 1 to the VNFM 120.

S430. The VNFM 120 instructs a VIM 115 to delete the virtual machine corresponding to the formal name.

S435. The VNFM 120 instructs the Orchestrator 125 to delete an alias 2 of the virtual machine.

S440. The VNFM 120 instructs a VNF 110 to delete the alias 1 of the virtual machine.

S445. The VNFM 120 sends a virtual machine name deletion message to the virtual machine name management apparatus 130, where the deletion message carries the alias 1.

S450. After querying other aliases and the formal name according to the alias 1, the virtual machine name management apparatus 130 deletes the formal name and the other aliases corresponding to the alias 1.

FIG. 4 and FIG. 5 respectively describe a process in which the VNFM 120 controls restart or termination of the virtual machine. Actually, the Orchestrator 125 may also control restart or termination of the virtual machine. The process in which the Orchestrator 125 controls restart or termination of the virtual machine is similar to the process in which the VNFM 120 controls restart or termination of the virtual machine, and is not further described in the embodiment of the disclosure.

Figure 6:
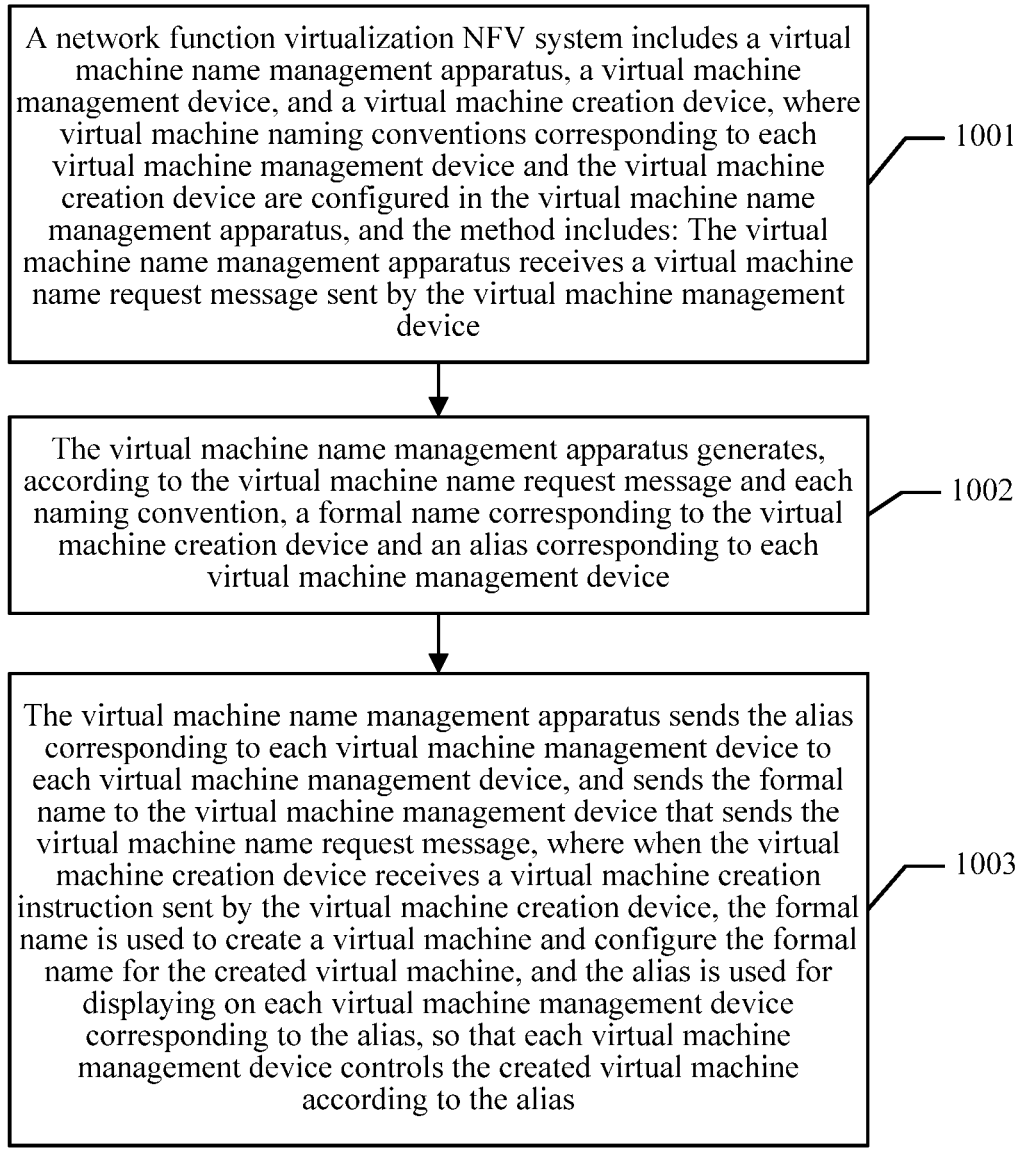
FIG. 6 is a flowchart of another embodiment of a method for displaying a virtual machine name according to an embodiment of the disclosure.

Referring to FIG. 6, an embodiment of a method for displaying a virtual machine name according to an embodiment of the disclosure includes:

1001. An NFV system includes a virtual machine name management apparatus, a virtual machine management device, and a virtual machine creation device, where virtual machine naming conventions corresponding to each virtual machine management device and the virtual machine creation device are configured in the virtual machine name management apparatus, and the method includes the virtual machine name management apparatus receiving a virtual machine name request message sent by the virtual machine management device.

1002. The virtual machine name management apparatus generates, according to the virtual machine name request message and each naming convention, a formal name corresponding to the virtual machine creation device and an alias corresponding to each virtual machine management device.

1003. The virtual machine name management apparatus sends the alias corresponding to each virtual machine management device to each virtual machine management device, and sends the formal name to the virtual machine management device that sends the virtual machine name request message where, when the virtual machine creation device receives a virtual machine creation instruction sent by the virtual machine creation device, the formal name is used to create a virtual machine and configure the formal name for the created virtual machine and the alias is used for displaying on each virtual machine management device corresponding to the alias, so that each virtual machine management device controls the created virtual machine according to the alias.

A method for displaying a virtual machine name is provided by the embodiment of the disclosure, and applied to a virtual machine name management apparatus in a NFV system. The NFV system further includes a virtual machine management device and a virtual machine creation device. Virtual machine naming conventions corresponding to each virtual machine management device and the virtual machine creation device are configured in the virtual machine name management apparatus. The method includes receiving, by the virtual machine name management apparatus, a virtual machine name request message sent by the virtual machine management device; generating, according to the virtual machine name request message and each naming convention, a formal name corresponding to the virtual machine creation device and an alias corresponding to each virtual machine management device; and sending the alias corresponding to each virtual machine management device to each virtual machine management device, and sending the formal name to the virtual machine management device that sends the virtual machine name request message where, when the virtual machine creation device receives a virtual machine creation instruction sent by the virtual machine creation device, the formal name is used to create a virtual machine and configure the formal name for the created virtual machine, and the alias is used for displaying on each virtual machine management device corresponding to the alias, so that each virtual machine management device controls the created virtual machine according to the alias. Compared with the prior art in which trouble is caused to work of maintenance personnel of devices because the same name is displayed for a same virtual machine in each virtual machine management device, the method for displaying a virtual machine name according to the embodiment of the disclosure may display different names for a same virtual machine in each virtual machine management device of a NFV system, thereby meeting requirements of maintenance personnel of each virtual machine management device.

Optionally, on a basis of the embodiment corresponding to FIG. 6, in another embodiment of the method for displaying a virtual machine name according to the embodiment of the disclosure, the method may further include receiving a name query request sent by the virtual machine management device, where the name query request carries an alias of a virtual machine to be operated; finding, according to the alias of the virtual machine to be operated, a formal name of the virtual machine to be operated that corresponds to the alias; and sending the formal name of the virtual machine to be operated to the virtual machine management device that sends the name query request, so that the virtual machine management device that sends the name query request performs, according to the formal name of the virtual machine to be operated, a corresponding operation on the virtual machine to be operated.

Optionally, on a basis of the optional embodiment corresponding to FIG. 6, in another embodiment of the method for displaying a virtual machine name according to the embodiment of the disclosure, when the operation is to delete the virtual machine to be operated, the method further includes receiving a virtual machine name deletion instruction sent by the virtual machine management device, where the virtual machine name deletion instruction carries the alias of the virtual machine to be deleted; and deleting, according to the alias of the virtual machine to be deleted, all aliases and the formal name of the virtual machine to be deleted.

The process of displaying a virtual machine name according to the embodiment of the disclosure may be understood with reference to the description of FIG. 1 to FIG. 5, and therefore is not further described herein.

Figure 7:
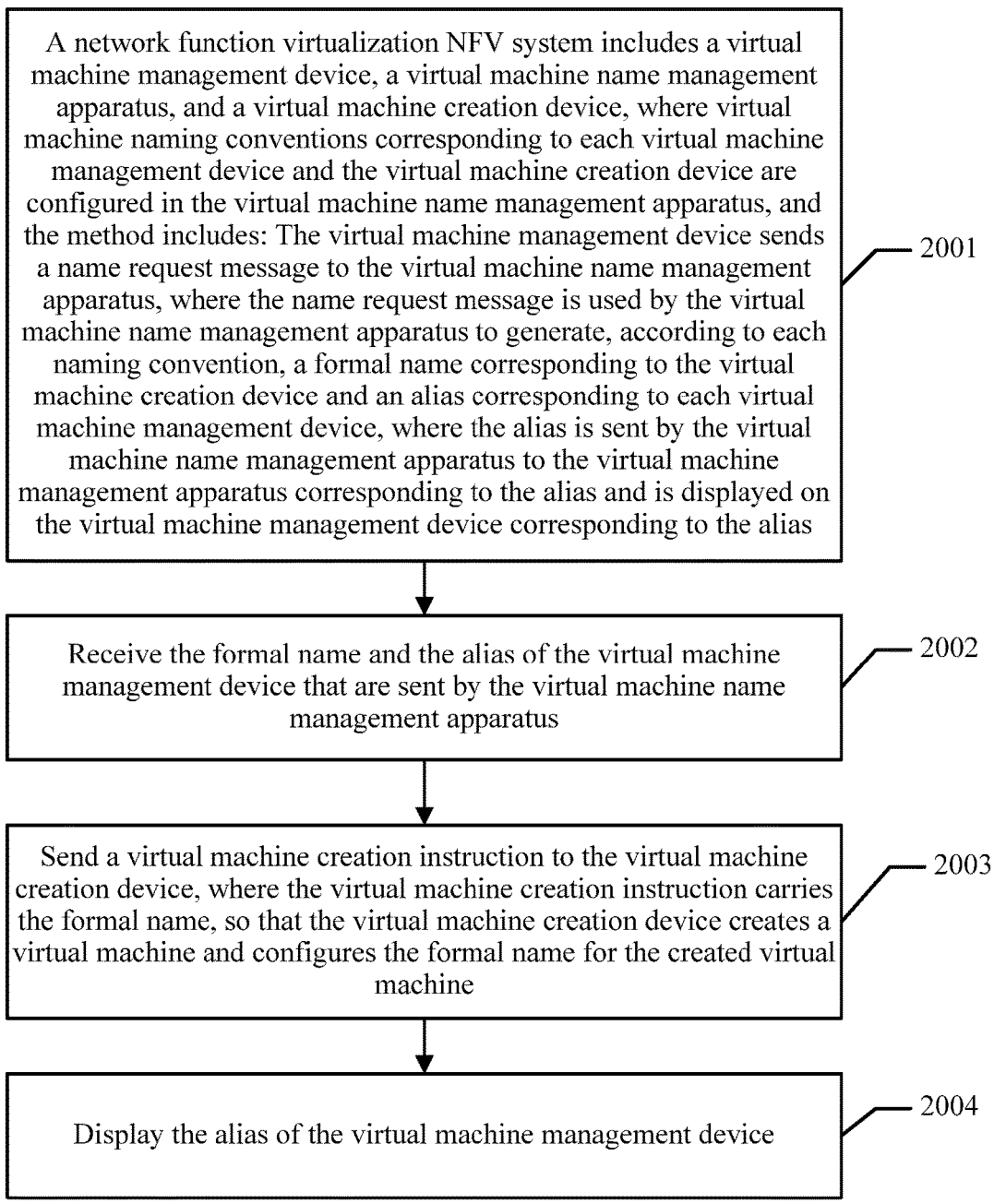
FIG. 7 is a flowchart of another embodiment of a method for displaying a virtual machine name according to an embodiment of the disclosure.

Referring to FIG. 7, an embodiment of a method for displaying a virtual machine name according to an embodiment of the disclosure includes: 2001. A NFV system includes a virtual machine management device, a virtual machine name management apparatus, and a virtual machine creation device, where virtual machine naming conventions corresponding to each virtual machine management device and the virtual machine creation device are configured in the virtual machine name management apparatus, and the method includes the virtual machine management device sending a name request message to the virtual machine name management apparatus, where the name request message is used by the virtual machine name management apparatus to generate, according to each naming convention, a formal name corresponding to the virtual machine creation device and an alias corresponding to each virtual machine management device, where the alias is sent by the virtual machine name management apparatus to the virtual machine management device corresponding to the alias and is displayed on the virtual machine management device corresponding to the alias.

2002. Receive the formal name and the alias of the virtual machine management device that are sent by the virtual machine name management apparatus.

2003. Send a virtual machine creation instruction to the virtual machine creation device, where the virtual machine creation instruction carries the formal name, so that the virtual machine creation device creates a virtual machine and configures the formal name for the created machine.

2004. Display the alias of the virtual machine management device.

A method for displaying a virtual machine name is provided by the embodiment of the disclosure, and applied to a virtual machine management device in a NFV system. The NFV system further includes a virtual machine name management apparatus and a virtual machine creation device. Virtual machine naming conventions corresponding to each virtual machine management device and the virtual machine creation device are configured in the virtual machine name management apparatus. The method includes sending, by the virtual machine management device, a name request message to the virtual machine name management apparatus, where the name request message is used by the virtual machine name management apparatus to generate, according to each naming convention, a formal name corresponding to the virtual machine creation device and an alias corresponding to each virtual machine management device and the alias is sent by the virtual machine name management apparatus to the virtual machine management device corresponding to the alias and is displayed on the virtual machine management device corresponding to the alias. The method also includes receiving the formal name and the alias of the virtual machine management device that are sent by the virtual machine name management apparatus; sending a virtual machine creation instruction to the virtual machine creation device, where the virtual machine creation instruction carries the formal name, so that the virtual machine creation device creates a virtual machine and configures the formal name for the created virtual machine; and displaying the alias of the virtual machine management device. Compared with the prior art in which trouble is caused to work of maintenance personnel of devices because a same name is displayed for a same virtual machine in each virtual machine management device, the method for displaying a virtual machine name according to the embodiment of the disclosure may display different names for a same virtual machine in each virtual machine management device of a NFV system, thereby meeting requirements of maintenance personnel of each virtual machine management device.

Optionally, on a basis of the embodiment corresponding to FIG. 7, in another embodiment of the method for displaying a virtual machine name according to the embodiment of the disclosure, the method may further include receiving an operation instruction for a virtual machine to be operated; sending a name query request to the virtual machine name management apparatus, where the name query request carries an alias of the virtual machine to be operated and the alias of the virtual machine to be operated is used by the virtual machine name management apparatus to find a formal name of the virtual machine to be operated; and receiving the formal name of the virtual machine to be operated, and performing, according to the formal name of the virtual machine to be operated, a corresponding operation on the virtual machine to be operated.

Optionally, on a basis of the optional embodiment corresponding to FIG. 7, in another embodiment of the method for displaying a virtual machine name according to the embodiment of the disclosure, when the operation is to delete the virtual machine to be operated, the method may further include sending a virtual machine name deletion instruction to the virtual machine name management apparatus, where the virtual machine name deletion instruction carries the alias of the virtual machine to be deleted, so that the virtual machine name management apparatus deletes, according to the alias of the virtual machine to be deleted, all aliases and the formal name of the virtual machine to be deleted.

The process of displaying a virtual machine name according to the embodiment of the disclosure may be understood with reference to the description of FIG. 1 to FIG. 5, and therefore is not further described herein.

Figure 8:
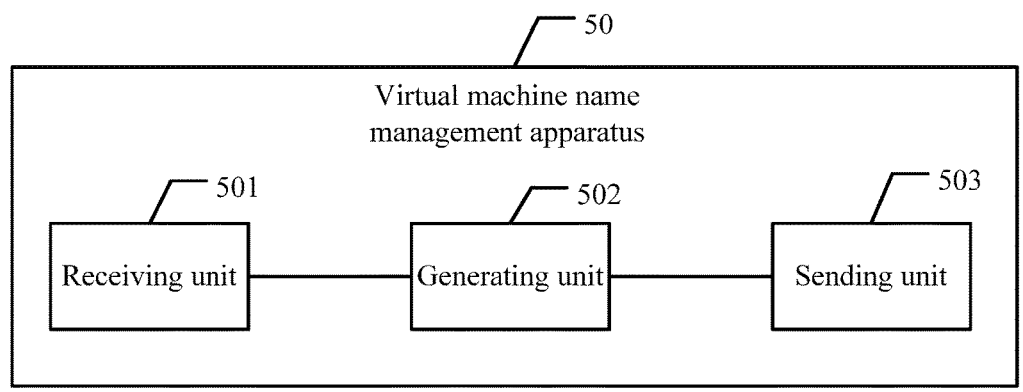
FIG. 8 is a schematic diagram of an embodiment of a virtual machine name management apparatus according to an embodiment of the disclosure.

Referring to FIG. 8, an embodiment of the disclosure provides a virtual machine name management apparatus 50, where the virtual machine name management apparatus 50 is applied in a NFV system, where the NFV system further includes a virtual machine management device and a virtual machine creation device, where virtual machine naming conventions corresponding to each virtual machine management device and the virtual machine creation device are configured in the virtual machine name management apparatus. The apparatus 50 includes a receiving unit 501 configured to receive a virtual machine name request message sent by the virtual machine management device; a generating unit 502 configured to generate, according to the virtual machine name request message received by the receiving unit 501 and each naming convention, a formal name corresponding to the virtual machine creation device and an alias corresponding to each virtual machine management device; and a sending unit 503 configured to send the alias generated by the generating unit 502 and corresponding to each virtual machine management device to each virtual machine management device, and send the formal name to the virtual machine management device that sends the virtual machine name request message where, when the virtual machine creation device receives a virtual machine creation instruction sent by the virtual machine creation device, the formal name is used to create a virtual machine and configure the formal name for the created virtual machine, and the alias is used for displaying on each virtual machine management device corresponding to the alias, so that each virtual machine management device controls the created virtual machine according to the alias.

In the embodiment of the disclosure, the virtual machine name management apparatus 50 is applied to a NFV system. The NFV system further includes a virtual machine management device and a virtual machine creation device. Virtual machine naming conventions corresponding to each virtual machine management device and the virtual machine creation device are configured in the virtual machine name management apparatus. The apparatus 50 includes a receiving unit 501 configured to receive a virtual machine name request message sent by the virtual machine management device; a generating unit 502 configured to generate, according to the virtual machine name request message received by the receiving unit 501 and each naming convention, a formal name corresponding to the virtual machine creation device and an alias corresponding to each virtual machine management device; and a sending unit 503 configured to send the alias generated by the generating unit 502 and corresponding to each virtual machine management device to each virtual machine management device, and send the formal name to the virtual machine management device that sends the virtual machine name request message where, when the virtual machine creation device receives a virtual machine creation instruction sent by the virtual machine creation device, the formal name is used to create a virtual machine and configure the formal name for the created virtual machine, and the alias is used for displaying on each virtual machine management device corresponding to the alias, so that each virtual machine management device controls the created virtual machine according to the alias. Compared with the prior art in which trouble is caused to work of maintenance personnel of devices because a same name is displayed for a same virtual machine in each virtual machine management device, the virtual machine name management apparatus provided by the embodiment of the disclosure may display different names for a same virtual machine in each virtual machine management device of a NFV system, thereby meeting requirements of maintenance personnel of each virtual machine management device.

Figure 9:
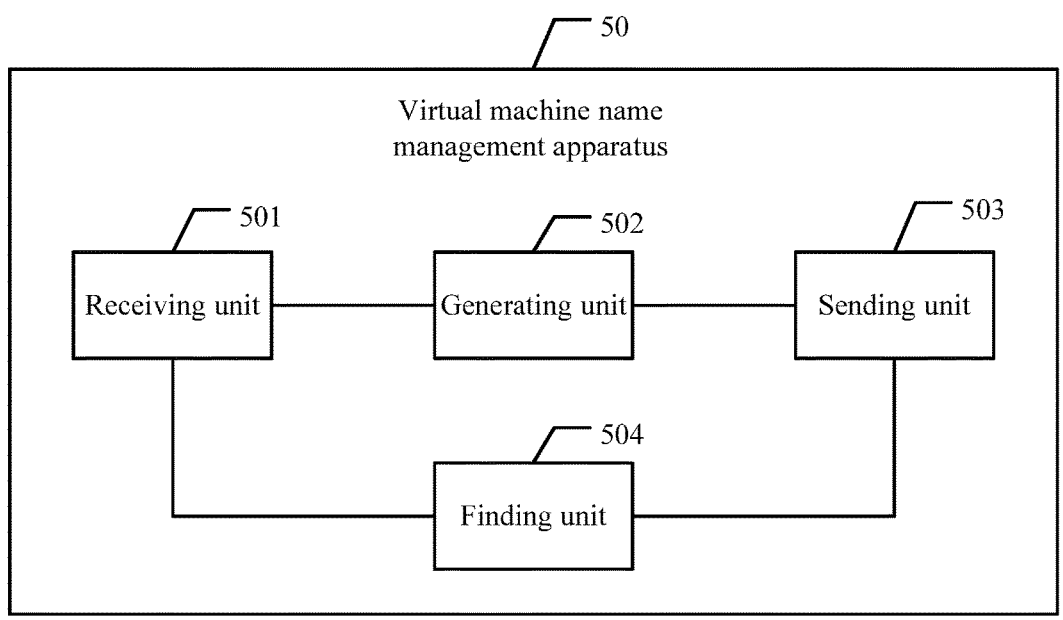
FIG. 9 is a schematic diagram of another embodiment of a virtual machine name management apparatus according to an embodiment of the disclosure.

Optionally, on a basis of the embodiment corresponding to FIG. 8, referring to FIG. 9, the virtual machine name management apparatus 50 provided by the embodiment of the disclosure further includes a finding unit 504. The receiving unit 501 is further configured to receive a name query request sent by the virtual machine management device, where the name query request carries an alias of a virtual machine to be operated; the finding unit 504 is configured to find, according to the alias of the virtual machine to be operated that is received by the receiving unit 501, a formal name of the virtual machine to be operated that corresponds to the alias; and the sending unit 503 is further configured to send the formal name of the virtual machine to be operated that is found by the finding unit 504 to the virtual machine management device that sends the name query request, so that the virtual machine management device that sends the name query request performs, according to the formal name of the virtual machine to be operated, a corresponding operation on the virtual machine to be operated.

Figure 10:
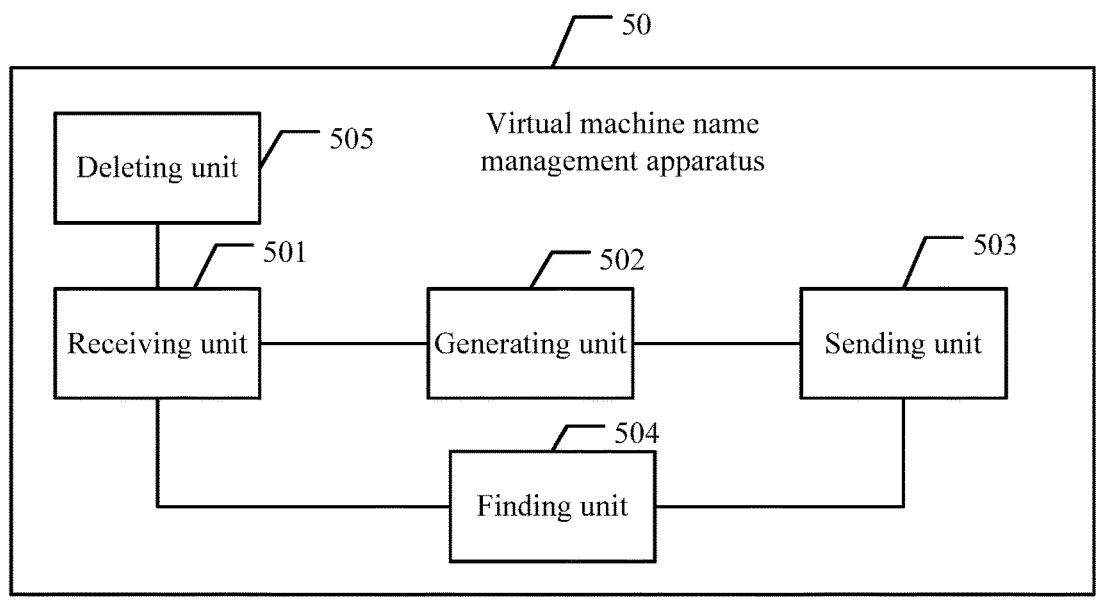
FIG. 10 is a schematic diagram of another embodiment of a virtual machine name management apparatus according to an embodiment of the disclosure.

Optionally, on a basis of the embodiment corresponding to FIG. 9, referring to FIG. 10, the virtual machine name management apparatus 50 provided by the embodiment of the disclosure further includes a deleting unit 505. The receiving unit 501 is further configured to receive, when the operation is to delete the virtual machine to be operated, a virtual machine name deletion instruction sent by the virtual machine management device, where the virtual machine name deletion instruction carries the alias of the virtual machine to be deleted; and the deleting unit 505 is configured to delete, according to the alias of the virtual machine to be deleted that is received by the receiving unit 501, all aliases and the formal name of the virtual machine to be deleted.

The process of displaying a virtual machine name according to the embodiment of the disclosure may be understood with reference to the description of FIG. 1 to FIG. 6, and therefore is not further described herein.

Figure 11:
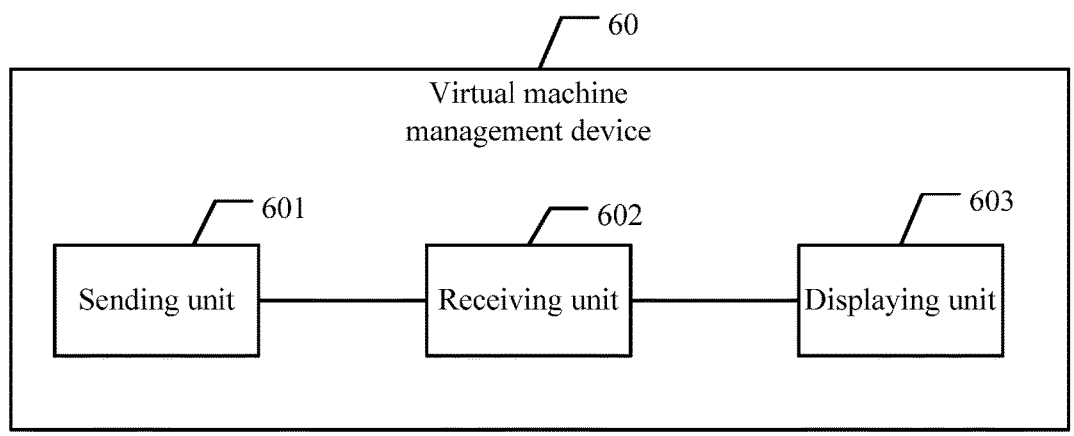
FIG. 11 is a schematic diagram of an embodiment of a virtual machine management device according to an embodiment of the disclosure.

Referring to FIG. 11, in an embodiment of a virtual machine management device 60 provided by an embodiment of the disclosure, the virtual machine management device 60 is applied in a NFV system, where the NFV system further includes a virtual machine name management apparatus and a virtual machine creation device, where virtual machine naming conventions corresponding to each virtual machine management device and the virtual machine creation device are configured in the virtual machine name management apparatus. The virtual machine management device 60 includes a sending unit 601 configured to send a name request message to the virtual machine name management apparatus, where the name request message is used by the virtual machine name management apparatus to generate, according to each naming convention, a formal name corresponding to the virtual machine creation device and an alias corresponding to each virtual machine management device, where the alias is sent by the virtual machine name management apparatus to the virtual machine management device corresponding to the alias and is displayed on the virtual machine management device corresponding to the alias; a receiving unit 602 configured to acquire the formal name and the alias of the virtual machine management device that are sent by the virtual machine name management apparatus; the sending unit 601, further configured to send a virtual machine creation instruction to the virtual machine creation device, where the virtual machine creation instruction carries the formal name received by the receiving unit 602, so that the virtual machine creation device creates a virtual machine and configures the formal name for the created virtual machine; and a displaying unit 603 configured to display the alias of the virtual machine management device that is acquired by the receiving unit 602.

In the embodiment of the disclosure, the virtual machine management device 60 is applied in a NFV system. The NFV system further includes a virtual machine name management apparatus and a virtual machine creation device. Virtual machine naming conventions corresponding to each virtual machine management device and the virtual machine creation device are configured in the virtual machine name management apparatus. The virtual machine management device 60 includes a sending unit 601 configured to send a name request message to the virtual machine name management apparatus, where the name request message is used by the virtual machine name management apparatus to generate, according to each naming convention, a formal name corresponding to the virtual machine creation device and an alias corresponding to each virtual machine management device and the alias is sent by the virtual machine name management apparatus to the virtual machine management device corresponding to the alias and is displayed on the virtual machine management device corresponding to the alias; a receiving unit 602 configured to acquire the formal name and the alias of the virtual machine management device that are sent by the virtual machine name management apparatus; the sending unit 601, further configured to send a virtual machine creation instruction to the virtual machine creation device, where the virtual machine creation instruction carries the formal name received by the receiving unit 602, so that the virtual machine creation device creates a virtual machine and configures the formal name for the created virtual machine; and a displaying unit 60 configured to display the alias of the virtual machine management device that is acquired by the receiving unit 602. Compared with the prior art in which trouble is caused to work of maintenance personnel of devices because a same name is displayed for a same virtual machine in each virtual machine management device, the virtual machine management device provided by the embodiment of the disclosure may display different names for a same virtual machine in each virtual machine management device of a NFV system, thereby meeting requirements of maintenance personnel of each virtual machine management device.

Figure 12:
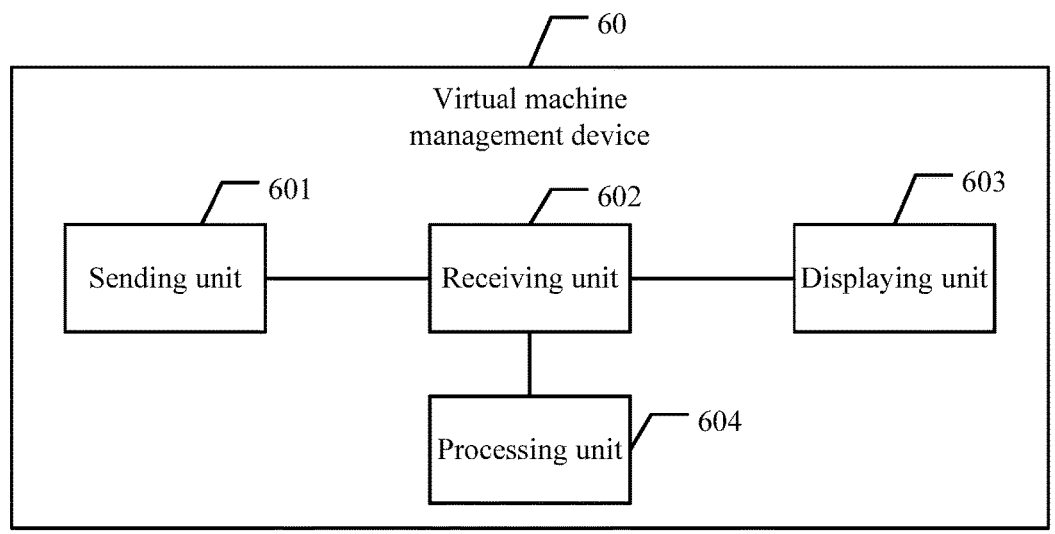
FIG. 12 is a schematic diagram of another embodiment of a virtual machine management device according to an embodiment of the disclosure.

Optionally, on a basis of the embodiment corresponding to FIG. 11, referring to FIG. 12, in another embodiment of the virtual machine management device 60 provided by the embodiment of the disclosure, the virtual machine management device 60 further includes a processing unit 604. The receiving unit 602 is further configured to acquire an operation instruction for a virtual machine to be operated; the sending unit 601 is further configured to send a name query request to the virtual machine name management apparatus, where the name query request carries an alias of the virtual machine to be operated, where the alias of the virtual machine to be operated is used by the virtual machine name management apparatus to find a formal name of the virtual machine to be operated; the receiving unit 602 is further configured to receive the formal name of the virtual machine to be operated; and the processing unit 604 is configured to perform, according to the formal name of the virtual machine to be operated that is received by the receiving unit 602, a corresponding operation on the virtual machine to be operated.

Optionally, on a basis of the embodiment corresponding to FIG. 12, in another embodiment of the virtual machine management device 60 provided by the embodiment of the disclosure, the sending unit 601 is further configured to send, when the operation is to delete the virtual machine to be operated, a virtual machine name deletion instruction to the virtual machine name management apparatus, where the virtual machine name deletion instruction carries the alias of the virtual machine to be deleted, so that the virtual machine name management apparatus deletes, according to the alias of the virtual machine to be deleted, all aliases and the formal name of the virtual machine to be deleted.

The process of displaying a virtual machine name according to the embodiment of the disclosure may be understood with reference to the description of FIG. 1 to FIG. 5 and FIG. 7, and therefore is not further described herein.

Figure 13:
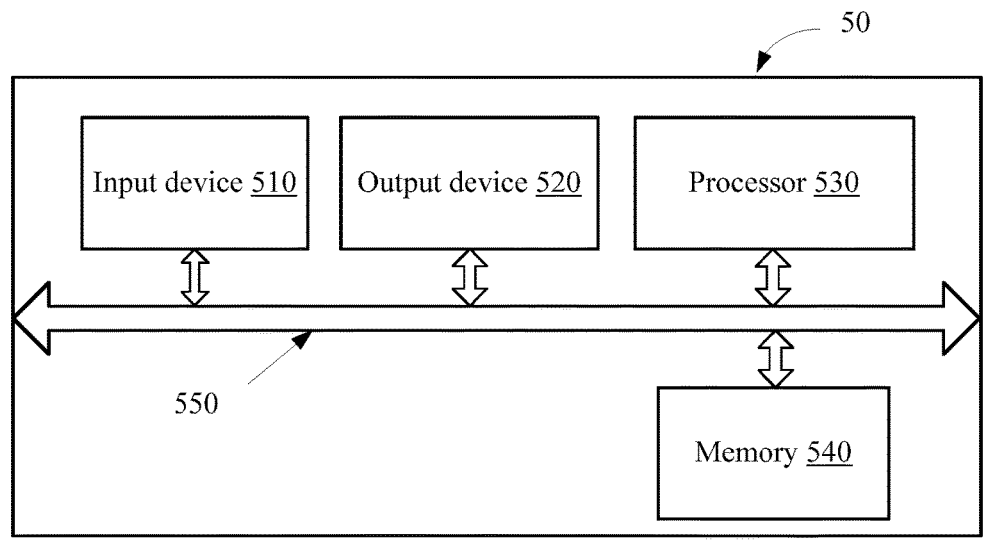
FIG. 13 is a schematic diagram of another embodiment of a virtual machine name management apparatus according to an embodiment of the disclosure.

FIG. 13 is a schematic structural diagram of a virtual machine name management apparatus 50 according to an embodiment of the disclosure. The virtual machine name management apparatus is applied in a NFV system, where the NFV system further includes a virtual machine management device and a virtual machine creation device, where virtual machine naming conventions corresponding to each virtual machine management device and the virtual machine creation device are configured in the virtual machine name management apparatus. The virtual machine name management apparatus 50 may include an input device 510, an output device 520, a processor 530, and a memory 540. The memory 540 may include a read-only memory and a random access memory, and provide an instruction and data for the processor 530. A part of the memory 540 may further include a non-volatile random access memory (NVRAM).

The memory 540 stores the following elements: an executable module or a data structure, or a subset thereof, or an extended set thereof; operation instructions, including various operation instructions, used to implement various operations; and an operating system including various system programs, used to implement various basic services and process hardware-based tasks.

In the embodiment of the disclosure, by invoking an operation instruction stored in the memory 540 (the operation instruction may be stored in the operating system), the processor 530 executes the following operations: receiving, by using the input device 510, a virtual machine name request message sent by the virtual machine management device; generating, according to the virtual machine name request message and each naming convention, a formal name corresponding to the virtual machine creation device and an alias corresponding to each virtual machine management device; and sending, by using the output device 520, the alias corresponding to each virtual machine management device to each virtual machine management device, and sending the formal name to the virtual machine management device that sends the virtual machine name request message, where when the virtual machine creation device receives a virtual machine creation instruction sent by the virtual machine creation device, the formal name is used to create a virtual machine and configure the formal name for the created virtual machine, and the alias is used for displaying on each virtual machine management device corresponding to the alias, so that each virtual machine management device controls the created virtual machine according to the alias.

The virtual machine name management apparatus 50 provided by the embodiment of the disclosure may display different names for a same virtual machine in each virtual machine management device of a NFV system, thereby meeting requirements of maintenance personnel of each virtual machine management device.

The processor 530 controls operations of the virtual machine name management apparatus 50. The processor 530 may also be called a Central Processing Unit (CPU). The memory 540 may include a read-only memory (ROM) and a random access memory (RAM), and provide an instruction and data for the processor 530. A part of the memory 540 may further include NVRAM. In a specific application, components of the virtual machine name management apparatus 50 are coupled together by using a bus system 550, where the bus system 550 may further include a power bus, a control bus, a status signal bus, and the like, in addition to a data bus. However, for the purpose of clear description, various buses in the figure are all labeled the bus system 550.

The foregoing method disclosed by the embodiment of the disclosure may be applied in the processor 530 or implemented by the processor 530. The processor 530 may be an integrated circuit chip, and has a signal processing capability. In an implementation process, each step of the foregoing method may be completed by using an integrated logic circuit of hardware in the processor 530 or an instruction in a form of software. The processor 530 may be a general processor, a digital signal processor (DSP), an application-specific integrated circuit (ASIC), a field programmable gate array (FPGA) or any other programmable logic component, a discrete gate or a transistor logic device, or a discrete hardware component, and may implement or execute each method, step, and logic block diagram disclosed by the embodiment of the disclosure. The general processor may be a microprocessor, or the processor may be any conventional processor or the like. The steps of the method disclosed with reference to the embodiment of the disclosure may be directly executed and completed by a hardware decoding processor, or executed and completed by a combination of hardware and software modules in a decoding processor. The software modules may be located in a mature storage medium in the art, such as a RAM, a flash memory, a ROM, a programmable read-only memory (PROM) or an erasable programmable read-only memory (EPROM), or a register. The storage medium is located in the memory 540. The processor 530 reads information in the memory 540, and completes the steps of the foregoing method in combination with the hardware of the processor.

Optionally, the input device 510 is further configured to receive a name query request sent by the virtual machine management device, where the name query request carries an alias of a virtual machine to be operated; the processor 530 is further configured to find, according to the alias of the virtual machine to be operated, a formal name of the virtual machine to be operated that corresponds to the alias; and the output device 520 is further configured to send the formal name of the virtual machine to be operated to the virtual machine management device that sends the name query request, so that the virtual machine management device that sends the name query request performs, according to the formal name of the virtual machine to be operated, a corresponding operation on the virtual machine to be operated.

Optionally, the input device 510 is further configured to receive, when the operation is to delete the virtual machine to be operated, a virtual machine name deletion instruction sent by the virtual machine management device, where the virtual machine name deletion instruction carries the alias of the virtual machine to be deleted; and the processor 530 is further configured to delete, according to the alias of the virtual machine to be deleted, all aliases and the formal name of the virtual machine to be deleted.

Figure 14:
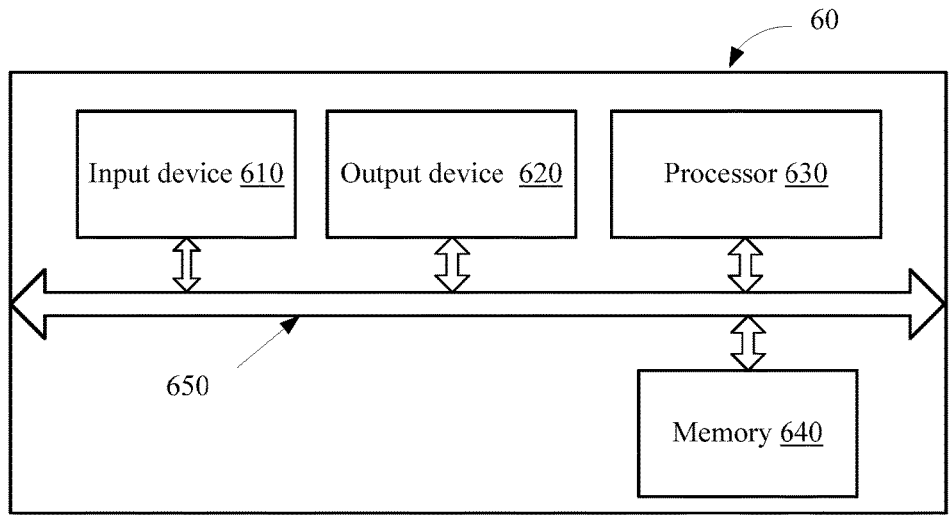
FIG. 14 is a schematic diagram of another embodiment of a virtual machine management device according to an embodiment of the disclosure.

FIG. 14 is a schematic structural diagram of a virtual machine management device 60 according to an embodiment of the disclosure. The virtual machine management device is applied in a NFV system, where the NFV system further includes a virtual machine name management apparatus and a virtual machine creation device, where virtual machine naming conventions corresponding to each virtual machine management device and the virtual machine creation device are configured in the virtual machine name management apparatus. The virtual machine management device 60 may include an input device 610, an output device 620, a processor 630, and a memory 640.

The memory 640 may include a read-only memory and a random access memory, and provide an instruction and data for the processor 630. A part of the memory 640 may further include a NVRAM.

The memory 640 stores the following elements: an executable module or a data structure, or a subset thereof, or an extended set thereof: operation instructions including various operation instructions, used to implement various operations; and an operating system including various system programs, used to implement various basic services and process hardware-based tasks.

In the embodiment of the disclosure, by invoking an operation instruction stored in the memory 640 (the operation instruction may be stored in the operating system), the processor 630 executes the following operations: sending, by using the output device 620, a name request message to the virtual machine name management apparatus, where the name request message is used by the virtual machine name management apparatus to generate, according to each naming convention, a formal name corresponding to the virtual machine creation device and an alias corresponding to each virtual machine management device, where the alias is sent by the virtual machine name management apparatus to the virtual machine management device corresponding to the alias and is displayed on the virtual machine management device corresponding to the alias; receiving, by using the input device 610, the formal name and the alias of the virtual machine management device that are sent by the virtual machine name management apparatus; sending, by using the output device 620, a virtual machine creation instruction to the virtual machine creation device, where the virtual machine creation instruction carries the formal name, so that the virtual machine creation device creates a virtual machine and configures the formal name for the created virtual machine; and displaying, by using the output device 620, the alias of the virtual machine management device.

The virtual machine management device 60 provided by the embodiment of the disclosure may display different names for a same virtual machine in each virtual machine management device of a NFV system, thereby meeting requirements of maintenance personnel of each virtual machine management device.

The processor 630 controls operations of the virtual machine management device 60. The processor 630 may also be called a Central Processing Unit (CPU). The memory 640 may include a read-only memory and a random access memory, and provide an instruction and data for the processor 630. A part of the memory 640 may further include a NVRAM. In a specific application, components of the virtual machine management device 60 are coupled together by using a bus system 650, where the bus system 650 may further include a power bus, a control bus, a status signal bus, and the like, in addition to a data bus. However, for the purpose of clear description, various buses in the figure are all labeled the bus system 650.

The foregoing method disclosed by the embodiment of the disclosure may be applied in the processor 630 or implemented by the processor 630. The processor 630 may be an integrated circuit chip, and has a signal processing capability. In an implementation process, each step of the foregoing method may be completed by using an integrated logic circuit of hardware in the processor 630 or an instruction in a form of software. The processor 630 may be a general processor, a DSP, an ASIC, an FPGA or any other programmable logic component, a discrete gate or a transistor logic device, or a discrete hardware component, and may implement or execute each method, step, and logic block diagram disclosed by the embodiment of the disclosure. The general processor may be a microprocessor, or the processor may be any conventional processor or the like. The steps of the method disclosed with reference to the embodiment of the disclosure may be directly executed and completed by a hardware decoding processor, or executed and completed by a combination of hardware and software modules in a decoding processor. The software modules may be located in a mature storage medium in the art, such as a RAM, a flash memory, a ROM, a PROM or an EPROM, or a register. The storage medium is located in the memory 640. The processor 630 reads information in the memory 640, and completes the steps of the foregoing method in combination with the hardware of the processor.

Optionally, the input device 610 is further configured to receive an operation instruction for a virtual machine to be operated; the output device 620 is further configured to send a name query request, where the name query request carries an alias of the virtual machine to be operated, where the alias of the virtual machine to be operated is used by the virtual machine name management apparatus to find a formal name of the virtual machine to be operated; the input device 610 is further configured to receive the formal name of the virtual machine to be operated; and the processor 630 is configured to perform, according to the formal name of the virtual machine to be operated, a corresponding operation on the virtual machine to be operated.

Optionally, the output device 620 is further configured to send, when the operation is to delete the virtual machine to be operated, a virtual machine name deletion instruction to the virtual machine name management apparatus, where the virtual machine name deletion instruction carries the alias of the virtual machine to be deleted, so that the virtual machine name management apparatus deletes, according to the alias of the virtual machine to be deleted, all aliases and the formal name of the virtual machine to be deleted.

Figure 15:
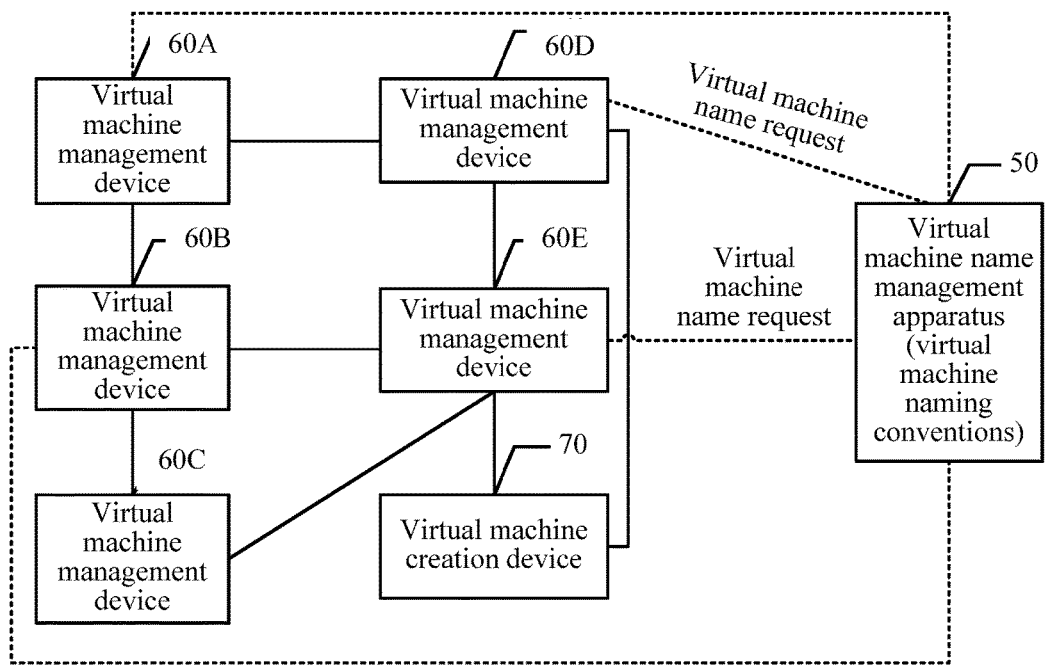
FIG. 15 is a schematic diagram of an embodiment of an NFV system according to an embodiment of the disclosure.

Referring to FIG. 15, an embodiment of a NFV system provided by an embodiment of the disclosure includes a virtual machine name management apparatus 50, virtual machine management devices 60A-60E, and a virtual machine creation device 70, where virtual machine naming conventions corresponding to each virtual machine management device 60A-60E and the virtual machine creation device 70 are configured in the virtual machine name management apparatus 50. The virtual machine name management apparatus 50 is configured to receive a virtual machine name request message sent by the virtual machine management device 60D and/or 60E; generate, according to the virtual machine name request message and each naming convention, a formal name corresponding to the virtual machine creation device 70 and an alias corresponding to each virtual machine management device 60A-60E; send the alias corresponding to each virtual machine management device 60A-60E to each virtual machine management device 60A-60E; and send the formal name to the virtual machine management device 60D and/or 60E that sends the virtual machine name request message. When the virtual machine creation device 70 receives a virtual machine creation instruction sent by the virtual machine management device 60D or 60E, the formal name is used to create a virtual machine and configure the formal name for the created virtual machine, and the alias is used for displaying on each virtual machine management device 60A-60E corresponding to the alias, so that each virtual machine management device 60A-60E controls the created virtual machine according to the alias; and the virtual machine management device 60A-60E is configured to receive the formal name and the alias of the virtual machine management device 60D and/or 60E that are sent by the virtual machine name management apparatus 50, send a virtual machine creation instruction to the virtual machine creation device 70, where the virtual machine creation instruction carries the formal name, so that the virtual machine creation device 70 creates a virtual machine and configures the formal name for the created virtual machine, and display the alias of the virtual machine management device 60A-60E.

The NFV system provided by the embodiment of the disclosure may display different names for a same virtual machine in each virtual machine management device 60A-60E of an NFV system, thereby meeting requirements of maintenance personnel of each virtual machine management device.

A person of ordinary skill in the art may understand that all or some of the steps of the methods in the embodiments may be implemented by a program instructing relevant hardware (such as a processor). The program may be stored in a computer readable storage medium. The storage medium may include a ROM, a RAM, a magnetic disk, or an optical disc.

A method, an apparatus, and a system for displaying a virtual machine name that are provided by the embodiments of the disclosure are described in detail above. In this specification, specific examples are used to describe the principle and implementation manners of the disclosure, and the description of the embodiments is only intended to help understand the method and core idea of the disclosure. Meanwhile, a person of ordinary skill in the art may, based on the idea of the disclosure, make modifications with respect to the specific implementation manners and the application scope. Therefore, the content of this specification shall not be construed as a limitation to the disclosure.

What is claimed is:

1. A method for displaying a virtual machine name in a network function virtualization (NFV) system, comprising:
   receiving, at a virtual machine name management apparatus, a virtual machine name request message from a first virtual machine management device of virtual machine management devices, wherein the virtual machine name management apparatus configures a virtual machine naming convention for each virtual machine management device and for a virtual machine creation device;
   generating, by the virtual machine name management apparatus according to the virtual machine name request message and each virtual machine naming convention, a formal name corresponding to the virtual machine creation device and an alias corresponding to each of the virtual machine management devices;
   sending, by the virtual machine name management apparatus, the alias corresponding to each of the virtual machine management devices to each of the virtual machine management devices; and
   sending, by the virtual machine name management apparatus, the formal name to the first virtual machine management device, wherein the formal name is used to create a virtual machine and configure the formal name for the created virtual machine when the virtual machine creation device receives a virtual machine creation instruction, and wherein the alias is used for displaying on each of the virtual machine management devices corresponding to the alias.

2. The method according to claim 1, further comprising:
   receiving a name query request from the first virtual machine management device, wherein the name query request carries an alias of a virtual machine to be operated;
   finding, according to the alias of the virtual machine to be operated, a formal name of the virtual machine to be operated that corresponds to the alias; and
   sending the formal name of the virtual machine to be operated to the first virtual machine management device for performing, according to the formal name of the virtual machine to be operated, a corresponding operation on the virtual machine to be operated.

3. The method according to claim 2, wherein when the corresponding operation is to delete the virtual machine to be operated, the method further comprises:
   receiving a virtual machine name deletion instruction from the first virtual machine management device, wherein the virtual machine name deletion instruction comprises the alias of the virtual machine to be deleted; and
   deleting, according to the alias of the virtual machine to be deleted, all aliases and the formal name of the virtual machine to be deleted.

4. A method for displaying a virtual machine name in a network function virtualization (NFV) system, comprising:
   sending, by a first virtual machine management device of virtual machine management devices, a name request message to a virtual machine name management apparatus, wherein the name request message is used to generate, according to a virtual machine naming convention for each virtual machine management device and for a virtual machine creation device, a formal name corresponding to the virtual machine creation device and an alias corresponding to each of the virtual machine management devices, and wherein the alias is displayed on each of the virtual machine management devices corresponding to the alias;
   receiving, by the first virtual machine management device, the formal name and the alias of the virtual machine management device from the virtual machine name management apparatus;
   sending a virtual machine creation instruction to the virtual machine creation device for creating a virtual machine, wherein the virtual machine creation instruction comprises the formal name and comprises instructions for configuring the formal name for the created virtual machine; and
   displaying the alias of the virtual machine management device.

5. The method according to claim 4, wherein the method further comprises:
   receiving an operation instruction for a virtual machine to be operated;
   sending a name query request to the virtual machine name management apparatus, wherein the name query request comprises an alias of the virtual machine to be operated, and wherein the alias of the virtual machine to be operated is used to find a formal name of the virtual machine to be operated;

receiving the formal name of the virtual machine to be operated; and performing, according to the formal name of the virtual machine to be operated, a corresponding operation on the virtual machine to be operated.

6. The method according to claim 5, further comprising sending a virtual machine name deletion instruction when the corresponding operation is to delete the virtual machine to be operated, wherein the virtual machine name deletion instruction comprises the alias of the virtual machine to be deleted and includes instructions to delete according to the alias of the virtual machine to be deleted, all aliases and the formal name of the virtual machine to be deleted.

7. A virtual machine name management apparatus, in a network function virtualization (NFV) system comprising:
a receiver configured to receive a virtual machine name request message from a first virtual machine management device of virtual machine management devices, wherein the virtual machine management name apparatus configures a virtual machine naming convention corresponding to each virtual machine management device and corresponding to a virtual machine creation device;
a processor coupled to the receiver and configured to generate, according to the virtual machine name request message and each virtual machine naming convention, a formal name corresponding to the virtual machine creation device and an alias corresponding to each of the virtual machine management devices;
a transmitter coupled to the processor and configured to send the alias corresponding to each of the virtual machine management devices to each of the virtual machine management devices and send the formal name to the first virtual machine management device, wherein the formal name is used to create a virtual machine and configure the formal name for the created virtual machine when the virtual machine creation device receives a virtual machine name creation instruction, and wherein the alias is used for displaying on each virtual machine management device corresponding to the alias.

8. The apparatus according to claim 7, wherein the receiver is further configured to receive a name query request from the first virtual machine management device, wherein the name query request carries an alias of a virtual machine to be operated, and wherein the processor is further configured to find, according to the alias of the virtual machine to be operated, a formal name of the virtual machine to be operated that corresponds to the alias, and wherein the transmitter is further configured to send the formal name of the virtual machine to be operated to the first virtual machine management device for performing, according to the formal name of the virtual machine to be operated, a corresponding operation on the virtual machine to be operated.

9. The apparatus according to claim 8, wherein the receiver is further configured to receive a virtual machine name deletion instruction from the first virtual machine management device when the corresponding operation is to delete the virtual machine to be operated, and wherein the virtual machine name deletion instruction comprises the alias of the virtual machine to be deleted; and wherein the processor if further configured to delete, according to the alias of the virtual machine to be deleted, all aliases and the formal name of the virtual machine to be deleted.

10. A virtual machine management device in a network function virtualization (NFV) system, comprising:

a transmitter coupled to a processor and configured to send a name request message to a virtual machine name management apparatus, wherein the virtual machine name management apparatus comprises a virtual machine naming convention for a virtual machine management device and for a virtual machine creation device, and wherein the name request message is used to generate, according to the virtual machine naming convention, a formal name corresponding to the virtual machine creation device and an alias corresponding to the virtual machine management device, and wherein the alias is displayed on the virtual machine management device corresponding to the alias;

a receiver coupled to the processor and configured to receive the formal name and the alias of the virtual machine management device from the virtual machine name management apparatus, wherein the transmitter is further configured to send a virtual machine creation instruction to the virtual machine creation device, and wherein the virtual machine creation instruction comprises the formal name and comprises instructions for creating a virtual machine and for configuring the formal name for the created virtual machine; and the processor configured to display the alias of the virtual machine management device.

11. The virtual machine management device according to claim 10, wherein the receiver is configured to receive an operation instruction for a virtual machine to be operated, and wherein the transmitter is further configured to send a name query request to the virtual machine name management apparatus, and wherein the name query request comprises an alias of the virtual machine to be operated, and wherein the alias of the virtual machine to be operated is used to find a formal name of the virtual machine to be operated, and wherein the receiver is further configured to receive the formal name of the virtual machine to be operated, and wherein the processor is further configured to perform, according to the formal name of the virtual machine to be operated, a corresponding operation on the virtual machine to be operated.

12. The virtual machine management device according to claim 11, wherein the transmitter is further configured to send a virtual machine name deletion instruction when the corresponding operation is to delete the virtual machine to be operated, and wherein the virtual machine name deletion instruction comprises the alias of the virtual machine to be deleted and includes instructions to delete, according to the alias of the virtual machine to be deleted, all aliases and the formal name of the virtual machine to be deleted.

13. A network function virtualization (NFV) system, comprising:
a processor;
at least one virtual machine management device coupled to the processor;
a virtual machine creation device coupled to the processor; and
a virtual machine name management apparatus coupled to the processor, wherein the virtual machine name management apparatus configures a virtual machine naming convention for each virtual machine management device and for the virtual machine creation device, and wherein the virtual machine name management apparatus is configured to:
receive a virtual machine name request message from a first virtual machine management device;
generate, according to the virtual machine name request message and each naming convention, a formal name corresponding to the virtual machine creation device and an alias corresponding to each of the virtual machine management devices;

send the alias corresponding to each of the virtual machine management devices to each of the virtual machine management devices; and send the formal name to the first virtual machine management device, wherein the formal name is used to create a virtual machine and configure the formal name for the created virtual machine when the virtual machine creation device receives a virtual machine creation instruction, and wherein the alias is used for controlling by each of the virtual machine management devices corresponding to the alias the created virtual machine according to the alias; and wherein the virtual machine management device is configured to:

receive the formal name and the alias of each of the virtual machine management devices;

send the virtual machine creation instruction to the virtual machine creation device, wherein the virtual machine creation instruction comprises the formal name and comprises instructions for configuring the formal name for the created virtual machine; and display the alias of the virtual machine management device.

* * * * *